March 12, 1946. D. KRYGSMAN 2,396,429
INTERNAL-COMBUSTION ENGINE
Filed Oct. 12, 1944   3 Sheets-Sheet 2

DAVID KRYGSMAN
INVENTOR
by his attorneys
Stebbins, Blenko & Webb

March 12, 1946.    D. KRYGSMAN    2,396,429
INTERNAL-COMBUSTION ENGINE
Filed Oct. 12, 1944    3 Sheets-Sheet 3

DAVID KRYGSMAN
INVENTOR
by his attorneys
Stebbins, Blenko & Webb

Patented Mar. 12, 1946

2,396,429

UNITED STATES PATENT OFFICE 2,396,429

INTERNAL-COMBUSTION ENGINE

David Krygsman, London, England

Application October 12, 1944, Serial No. 558,294
In Great Britain December 24, 1943

4 Claims. (Cl. 123—51)

This invention consists in improvements in or relating to internal-combustion engines of the opposed piston type, that is to say, to engines in which in each cylinder there are two pistons moving constantly in opposition one to the other. The invention is concerned primarily with engines of this type in which coal dust or solid fuel provides the necessary motive force, and an object of the invention is to provide means which will produce an improved combustion of the fuel and a further object is to afford a greater protection of the pistons and liners by preventing seepage of finely-divided fuel or waste products of combusted fuel between the main body of the pistons and the cylinder wall.

The present invention comprises in an engine of the above type, the provision of means for injecting the finely-divided solid fuel at or approximately at the commencement of the compression stroke.

The combustion of the fuel is improved by this means and is still further improved by a second feature of the invention which comprises injecting the fuel so that it enters substantially at the position of the axis of the cylinder, and each of the cylinder heads is formed with a hemispherical recess so that when the two pistons are brought together a substantially spherical combustion space is afforded. This not only improves combustion but also prevents to a large extent the finely-divided fuel from collecting on the cylinder wall.

Conveniently, the heads of the two pistons are so shaped that at the end of the compression stroke one piston head will telescope within the other.

The invention also comprises, in addition to the usual piston rings, a seal formed by providing in each piston between a pair of adjacent rings, an air space which is sealed at its outer periphery by the internal cylinder wall. Conveniently, means is provided to supply to these air sealing spaces air or gaseous medium under compression and this may be arranged to occur continuously or mainly at one end or the other of the piston stroke.

The foregoing and other features of the invention will be more clearly understood from the following description of three preferred examples of the invention illustrated in the accompanying drawings, in which Figure 1 shows schematically in longitudinal section an engine cylinder having in it two opposed pistons shown at the end of their power stroke;

Like reference numerals indicate like parts in the several figures of the drawings.

Figure 1:
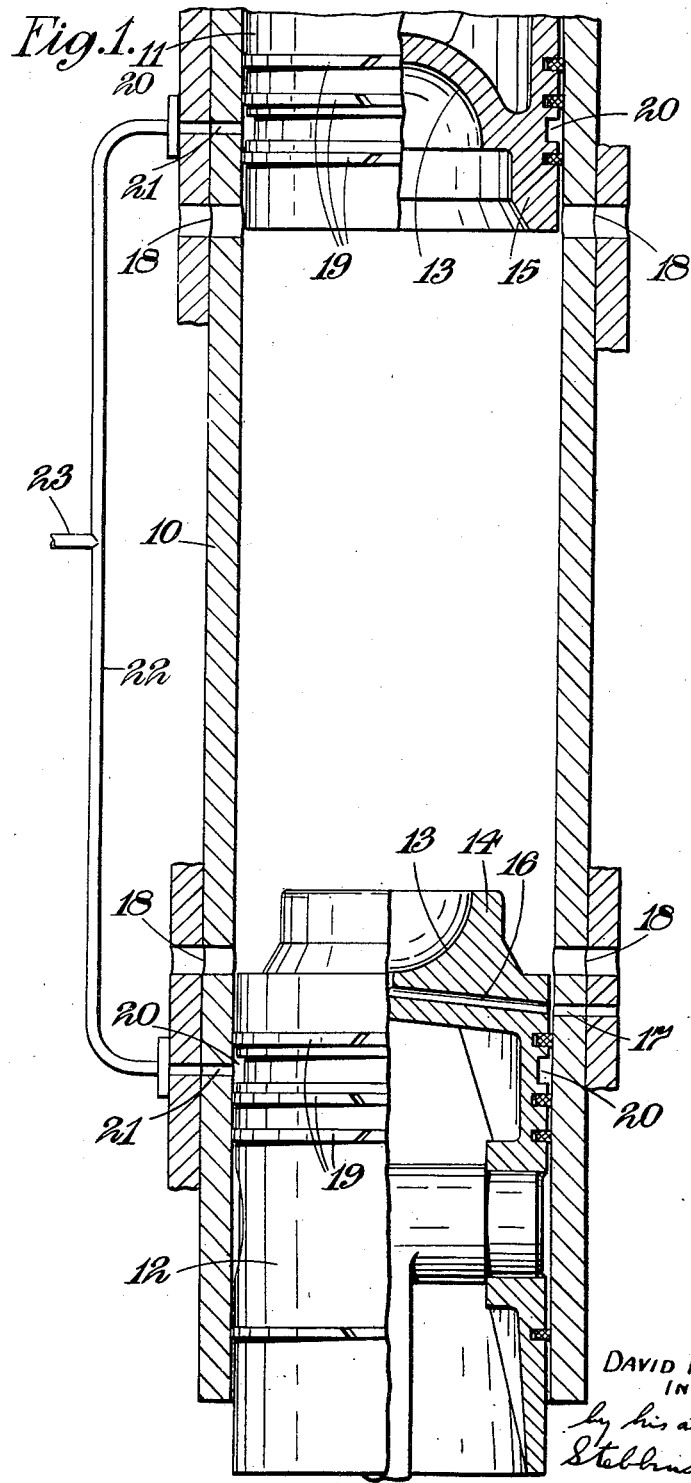
Figure 2:
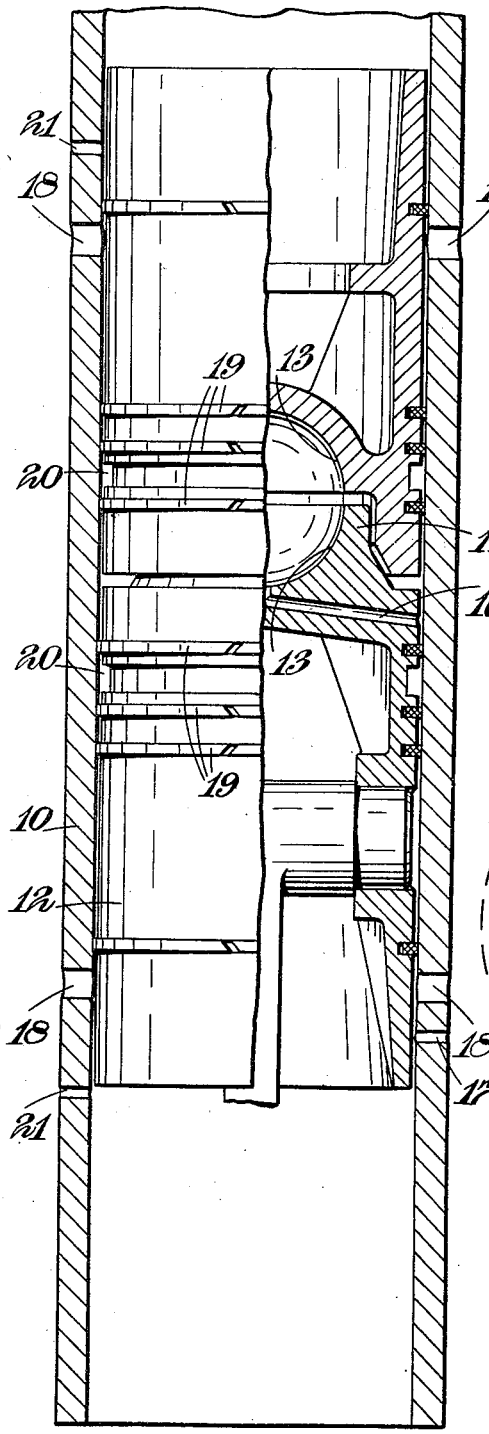
Figure 2 is a similar view showing the pistons at the commencement of the power stroke.

As shown in Figures 1 and 2, there are arranged in cylinder 10 two pistons 11 and 12, the central portion of the head of each of which is formed with a hemispherical recess 13. The recess in one piston, for example, the lower piston 12, is bounded by an annular flange 14 which is spaced from the wall of cylinder 10, and this flange is shaped to enter within a complementarily formed flange 15 in the companion piston 11. The flange 15 is concentric with and surrounds the hemispherical recess in that piston.

In order to supply fuel to the engine, a radial passage 16 in the lower piston opens at one end centrally into the recess 13 and at its other end into the side wall of the piston so that when the lower piston has reached the end of its down or power stroke, passage 16 will register with an inlet port 17 in the side wall of the cylinder.

Port 17 is associated with any preferred means (not shown) for injecting fuel so that the latter will be forced through port 17 and into passage 16 substantially at the beginning of the compression stroke of the piston. The provision of the hemispherical recess 13 tends to direct the injected fuel coaxially through the cylinder towards the companion piston 11.

Exhaust and scavenging passages 18 as usual are shown to be uncovered by the pistons as they near the ends of their power strokes.

In addition to the usual piston rings 19, in each cylinder, an additional seal is formed by providing in each piston, between a pair of adjacent piston rings, and air space 20 which is sealed at its outer periphery by the cylinder wall and the piston rings on each side thereof. These air sealing spaces are, at the end of the power or working stroke, brought into alignment with inlet ports 21 opening through the cylinder wall and communicating with one another by pipe 22. If necessary or desirable a compressor may be provided to supply compressed air to pipe 22 through a branch pipe 23 which air is forced into the sealing space 20, and serves effectively to prevent seepage of finely-divided fuel or the waste products of combusted fuel, between the main body of the piston and the cylinder wall.

Figure 4:
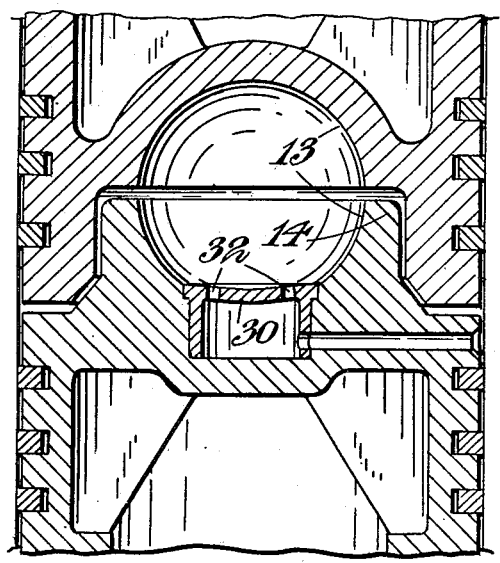

In a modified form of the invention, as illustrated in Figure 4, the pistons 11 and 12 with their hemispherical recesses 13 and means for injection of solid fuel, are similar to those already described and are referred to by similar reference characters, but in this form of the invention a nozzle 30 is now inserted at the base of the recess in piston 12 or in that piston through which it is intended to inject the fuel. In the form shown, the nozzle has a tubular body which is a press fit in a cylindrical extension of the recess 13 and is provided with two or more outlets 32 in order more evenly to distribute the fuel as it is forced into the cylinder.

Figure 3:
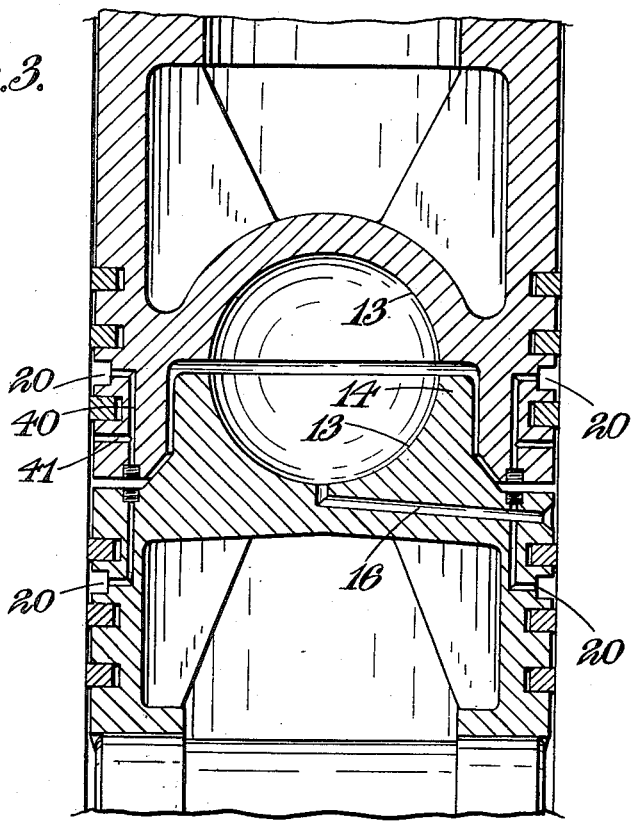
Figures 3 and 4 are views similar to Figure 2 of modifications of the invention.

In a still further modification as shown in Figure 3, the air sealing spaces 20, instead of being interconnected by an external pipe 22 are interconnected by internal passages 40, 41 each of which latter opens into the clearance between the piston heads and the cylinder wall, this clearance space being closed and bounded by adjacent piston rings in the two pistons. Compressed gaseous medium will be forced into the sealing spaces as the pistons approach one another and gaseous pressure will be maintained in the spaces throughout the whole period of working of the engine.

Figure 5:
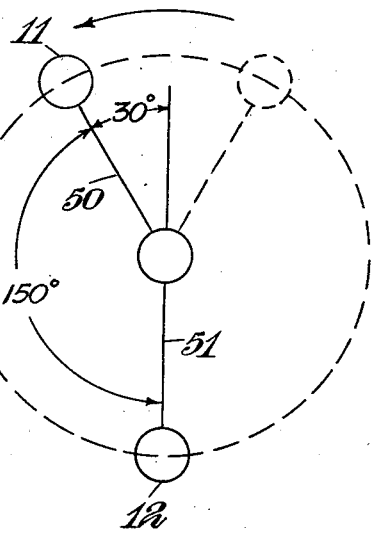
Figure 5 is a diagram illustrating a preferred setting for the pistons.

In engines of this type it has been customary for the pistons to be connected to a crankshaft by means of cranks disposed 180° apart. It is preferred, however, in the present invention to arrange the cranks so that one piston will be advanced relatively to the other, that is to say, the cranks will be displaced at an angle of either less than or more than 180°. For example, as indicated in Figure 5, crank 50 for piston 11 is shown as separate from crank 51 of piston 12 by an angle of 150°. Alternatively, crank 50 could have been in the dotted-line position relatively to crank 51 so that considered in the direction of rotation, it is displaced by an angle of 210°.

It will be appreciated that by the present invention many advantages are obtained, namely:

The shape of the piston heads prevents the solid fuel power from seeping between the pistons and the cylinder wall.

The usual difficulty of injection of solid fuel is overcome by injecting at the commencement of the compression stroke instead of, as hitherto, at the end thereof. This is assisted by the crank arrangement described which also prevents a mutual dead-centre position of the two pistons.

By arranging for the pistons to telescope one within the other the compression space is reduced as compared with pistons having non-telescoping arrangements and consequently high rate of compression with the consequent gasification and efficient combustion of fuel is obtained.

By the crank setting described, the ultimate compression volume is substantially maintained for 30° on either side of the dead-centre of one of the pistons. The result is that there is more time to complete the combustion of the fuel than in the more usual type of engine.

The pistons are sealed effectively by the air seal without any wear occurring on the piston rings or the cylinder wall. The air may be, and conveniently is, approximately at a pressure of 40 lbs. per square inch, and during the compression and combustion strokes the pressure in the air spaces is maintained at approximately the same pressure as that within the cylinder.

The air compressed within the air space, however, remains cold as compared with that of the gases within the cylinder.

During the expansion stroke, air from these spaces is released, thus keeping the cylinder heads clean especially in the second-described example.

The first piston ring is balanced by equal pressures both above and below the ring and this balance is maintained throughout the whole working cycle.

Lubricating oil can be introduced through the same passages by which air is introduced to the sealing spaces and by thus introducing the oil carbonisation of the latter is prevented.

When a nozzle is provided for the introduction of the fuel, this can be made of refractory material and may constitute a preheating device which will assist in the volatilising of the fuel.

The engine is more reliable in operation owing to the elimination of intricate fuel pumps as the smallest bore through which fuel passes need not be less than 10 mms. in diameter and fuel is introduced against substantially atmospheric pressure.

The timing of the fuel injection can never be wrongly adjusted.

Cheaper fuel than hitherto, even coal-dust admixed with sawdust, is possible.

The pistons require less piston rings for efficient sealing and these can be of simple design avoiding expensive double or triple sealing rings.

The engine can be maintained and serviced by less skilled persons than usual.

I claim:

1. In an engine of the type described, a piston reciprocable in a cylinder, sealing rings on said piston, an annular air space in the exterior of the piston between adjacent rings, and a port in the cylinder wall for admitting sealing gas under pressure to said space.

2. In an engine of the type described, a piston reciprocable in a cylinder, sealing rings on said piston, an annular air space in the exterior of the piston between adjacent rings, a second piston in said cylinder generally similar to the first-mentioned piston and opposed thereto, and means interconnecting the air spaces of the two pistons when at the outer ends of their paths.

3. In an engine of the type described, a piston reciprocable in a cylinder, sealing rings on said piston, an annular air space in the exterior of the piston between adjacent rings, a second piston in said cylinder generally similar to the first-mentioned piston and opposed thereto, and means interconnecting the air spaces of the two pistons comprising air inlet ports in the wall of the cylinder and a passage connecting said ports.

4. In an engine of the type described, a piston reciprocable in a cylinder, sealing rings on said piston, an annular air space in the exterior of the piston between adjacent rings, a second piston in said cylinder generally similar to the first-mentioned piston and opposed thereto, and means interconnecting the air spaces of the two pistons comprising passages formed in each piston and connecting the air space thereof with the space between the cylinder wall and the head of the pistons.

DAVID KRYGSMAN.